United States Patent [19]

Rankl et al.

[11] Patent Number: 5,322,909

[45] Date of Patent: Jun. 21, 1994

[54] WATER-DILUTABLE AIR-DRYING BINDERS, A PROCESS FOR PRODUCING THEM AND THEIR USE IN AIR-DRYING BINDERS

[75] Inventors: Franz-Josef Rankl; Aurel Blaga, both of Wuppertal; Heinrich Stolzenbach, Wuppertal-Ronsdorf; Hans-Peter Patzschke; Siegfried Kowalzick, both of Wuppertal; Franjo Gol, Leverkusen, all of Fed. Rep. of Germany

[73] Assignee: Herberts GmbH, Wuppertal, Fed. Rep. of Germany

[21] Appl. No.: 949,307

[22] Filed: Sep. 22, 1992

[30] Foreign Application Priority Data

Sep. 26, 1991 [DE] Fed. Rep. of Germany ....... 4132077

[51] Int. Cl.$^5$ ............................ C08F 8/46; C08F 8/30
[52] U.S. Cl. ..................................................... 525/451
[58] Field of Search ........................................... 525/451

[56] References Cited

U.S. PATENT DOCUMENTS

| | | | |
|---|---|---|---|
| 3,511,816 | 5/1970 | Dickakian | 525/271 |
| 4,075,135 | 2/1978 | Jozwiak, Jr. et al. | 524/811 |
| 4,137,282 | 1/1979 | Otsuki et al. | 525/184 |
| 4,762,883 | 8/1988 | Goel | 525/437 |

*Primary Examiner*—Vasu S. Jagannathan
*Attorney, Agent, or Firm*—Richard A. Speer; Michael O. Warnecke

[57] ABSTRACT

A binder, neutralizable with bases, for producing siccativated aqueous coating agents, based on a polydiene resin partially crosslinked with bis(2-oxazoline), with an acid number of 50 to 100, that is obtainable by anhydrous reaction of A. 40 to 80 wt % of one or several polydiene oils with a weight-average molecular weight of 300 to 5000,
B. 5 to 25 wt % of one or several $\alpha,\beta$-ethylenically unsaturated carboxylic acids,
C. 1 to 10 wt % of one or several bis(2-oxazoline)s and
D. 0 to 20 wt % of one or several physically curing resins and/or ethylenically unsaturated monomers, transfer into an aqueous medium and reaction with E. 1 to 40 wt % of one or several ethylenically unsaturated monomers in presence of an oil-soluble, free-radical-forming polymerization initiator and optionally a polymerization regulator, wherein each of the above percentages by weight relates to the sum of components A, B, C, D, and E. A process for production of the binder and its use in aqueous coating agents.

4 Claims, No Drawings

WATER-DILUTABLE AIR-DRYING BINDERS, A PROCESS FOR PRODUCING THEM AND THEIR USE IN AIR-DRYING BINDERS

The invention relates to a neutralized, water-dilutable oxidatively-drying binder that is suitable for producing particularly efficient air-drying primers, extenders and one-coat lacquers, as well as the process for producing the same and their use.

Aqueous coating agents are becoming increasingly important for reasons of environmental protection, since they require little or no organic solvents for processing. Thus U.S. Pat. No. 3,511,816 describes polymers from relatively low-molecular polybutadienes and maleic anhydride that form coatings adhering to metals. These products are made water-dilutable by partial neutralization with amines and serve as binders for water-dilutable coating systems. In order to obtain useful film-forming properties, the molecular weight of the binder must be raised so far that they, owing to their high viscosity, cause processing difficulties that must be compensated by solvent addition.

In DE-A-22 33 274, DE-A-26 33 362 and DE-A-27 54 733, unsaturated monomers are grafted onto polybutadiene oil-maleic anhydride adducts, whereby the anhydride group can be partially esterified, amidated, or imidated. Although these polybutadiene oil binders show improved drying, they do not have completely satisfactory water resistance and corrosion resistance in fast-drying primers. The attempts made to this day to improve the physical and chemical properties of such binders have not so far been completely satisfactory.

The problem of the invention is to make available air-drying binders that lead to fast-drying coating agents with good water resistance and good corrosion resistance with excellent crosslinking reactivity.

It has proved possible to solve this problem by introducing carboxyl groups into a polyolefin with numerous 1,4-double bonds and reacting with bis(oxazoline). After neutralizing the remaining carboxyl groups, graft polymerization is carried out, preferably with a vinyl monomer in aqueous emulsion. With these low-viscosity, low-solvent graft polymers according to the invention, a coating can be dried, even without adding metallic driers, in a very short time at various temperatures, preferably at room temperature. The coatings obtained have excellent properties with regard to water resistance and gloss. With addition of a metal-containing drier, a coating of greater hardness can be obtained. Accordingly the unsaturated emulsions according to the invention have particularly advantageous properties with regard to drying, water resistance and chemical resistance.

The subject matter of the invention is therefore a binder, neutralizable with bases, for producing siccativated aqueous coating agents, based on a polydiene resin partially crosslinked with bis(2-oxazoline), with an acid number of 50 to 100, that is obtainable by anhydrous reaction of A. 40 to 80 wt % of one or several polydiene oils with a weight-average molecular weight of 300 to 5000,
B. 5 to 25 wt % of one or several $\alpha,\beta$-ethylenically unsaturated carboxylic acids,
C. 1 to 10 wt % of one or several bis(2-oxazoline)s and
D. 0 to 20 wt % of one or several physically curing resins and/or ethylenically unsaturated monomers, transfer into an aqueous medium and reaction with
E. 1 to 40 wt % of one or several ethylenically unsaturated monomers in presence of an oil-soluble, free-radical-forming polymerization initiator and optionally a polymerization regulator, wherein each of the above percentages by weight relates to the sum of components A, B, C, D, and E.

In producing the binder acording to the invention, the procedure is preferably first to react the components A to D successively without water addition. The further reaction with the monomer E takes place in aqueous phase after addition of water, neutralizing agent and optionally further additives that are added before dispersion.

As component A, preferably more than 40 wt %, especially more than 50 wt %, of polydiene oil is applied. The upper limit is preferably below 80 wt %, especially below 70 wt %.

Preferred polydiene oils are polydienes (A) with a number-average molecular weight of 300 to 5000, preferably 1000 to 3000, viscosities of 500–5000 mPa.s (at 20° C.), and a Wijs iodine number of 200–500 g iodine/100 g substance and have preferably 1,4-cis or 1,4-trans linking. These are ordinary commercial products familiar to the expert. Examples are polybutadiene oils of various configurations or polypentadiene oils. Mixtures of such polybutadiene oils of different molecular weights or different configurations, e.g. also polypentadiene oils, can also be used. Polybutadiene oils with more than 60% 1,4-cis component and the lowest possible 1,2-vinyl group content (preferably below 5%) are preferred, the percentages in each case relating to the number of double bonds. Butadiene copolymers with up to 25 wt % of other comonomers, such as styrene, methylstyrene, vinyltoluene, (meth)acrylic acid, vinylacetic acid, maleic acid as well as derivatives, e.g. esters, of the acids mentioned and their mixtures can also be applied.

As component B, preferably more than 5, especially more than 8, wt % of $\alpha,\beta$-unsaturated carboxylic acids are applied. The upper limit is preferably below 25 wt %, especially below 23 wt %.

$\alpha,\beta$-ethylenically unsaturated mono- or dicarboxylic acids (B) are for example acrylic acid, methacrylic acid, itaconic acid, maleic acid, fumaric acid and their mixtures or anhydrides. Preferably maleic anhydride or itaconic anhydride are applied.

The adducts of polydienol (A) and $\alpha,\beta$-unsaturated carboxylic acid, e.g. maleic anhydride (B), can be prepared by known methods. In general, the mixtures of the components are heated for 1 to 4 hours at temperatures of 150° to 250° C., optionally with addition of small amounts of aromatic solvents, e.g. xylene, while simultaneously an inert gas stream, such as nitrogen, is led through or over the mixture, as well as which the addition of 0.01 to 0.5 wt %, relative to the sum of A and B, of one or several polymerization inhibitors is useful. Preferred inhibitors are for example hydroquinone, hydroquinone monomethyl ether, 2,5-di-tert-butylhydroquinone and benzoquinone, but also diphenylamine, styrenized diphenylamines, p-phenylenediamine derivatives, naphthylamine or thio compounds such as mercaptobenzimidazole or dilauryl 3,3'-thiodipropionate as well as $\alpha$-dimerized methylstyrene and their mixtures.

The cyclic anhydrides can be broken down by reaction with water, monoalcohols or monoamines to carboxyl-group-containing compounds. As monoalcohols, saturated or unsaturated linear, branched or cyclic $C_1$ to $C_{18}$ monoalcohols can be used, such as for example methanol, ethanol, propanol, isopropanol, butanol, isobutanol, secondary butanol, tertiary butanol, amyl alcohol, cyclohexanol, benzyl alcohol, ethylhexyl alcohol, lauryl alcohol, isodecanol or alkoxyglycols, such as butoxyethanol, alkoxypropanols, such as ethoxypropanol or propylglycol. Saponification-stable esters obtained with isopropanol, sec-butanol, cyclohexanol, 2-ethyl-1-hexanol or 2,2-dimethyl-1-butanol are preferred.

The adduct from component A with an α,β-unsaturated dicarboxylic acid or its anhydride can then preferably be partially amidated by a compound with an amino group. This partial amidation can be carried out by conventional processes. For example, the adduct is reacted with the compound in an appropriate solvent or in absence of a solvent at 30° to 150° C. in presence of a polymerization inhibitor and optionally a catalyst, such as a mineral acid or an organic acid. Amines preferably used are secondary and/or primary amines, preferably secondary monoamines, especially alkylamines such as dimethylamine, diethylamine, diisopropylamine, di-n-butylamine and their mixtures: functional amines, such as diethanolamine, can also be used.

Partial amidation of the polydiene oil (A) reacted with an α,β-unsaturated dicarboxylic acid (B), for example of a maleated polybutadiene oil, means the ring-opening reaction at preferably 10 to 90 mole percent of the anhydride groups present in the product.

Before amidation, for example 3 to 10 wt % of primary or secondary monoamine, as explained above, can be applied, wherein the weight percentage relates to the sum of the components A, B, C, D, E and the amine applied for producing the binder.

The partial amidation proceeds in two stages:
(a) the first stage opens the necessary percentage, e.g. 1 to 10%, of the amide groups, for the 2-oxazoline reaction; and
(b) the second stage follows after the reaction with the bis(2-oxazoline)component.

As component C preferably more than 1 wt % and less than 10 wt %, especially less than 5 wt %, of bis(2-oxazoline) are applied.

The bis(2-oxazoline) derivatives are characterized by the following formula,

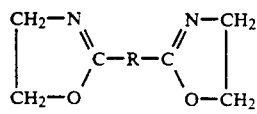

wherein R is a divalent linear or branched alkyl, cycloalkyl or optionally substituted aryl group, especially the phenyl group.

Preferred bis(2-oxazoline) derivatives (C) are e.g. 1,3-phenylenebis(2-oxazoline), 1,4-phenylenebis(2-oxazoline) and 1,4-cyclohexylbis(2-oxazoline).

The reaction between the partially amidated adduct from polydiene oil and an α,β-unsaturated carboxylic acid, e.g. butadiene maleate oil, and the bis(2-oxazoline) can be carried out in the presence, but preferably in the absence, of an organic solvent at 90° to 120° C., optionally under nitrogen.

The reaction occurs according to the following mechanism:

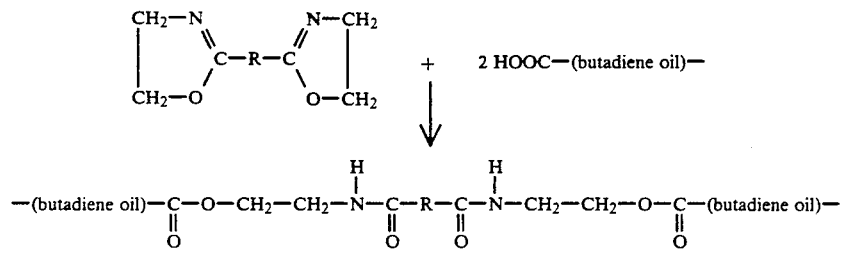

Through this reaction, with the aid of carboxyl groups, a molecular enlargement is initiated, whereby with increasing amount of the bis(2-oxazoline) component the molecular weight is distinctly increased and the resin viscosity raised.

Further according to the invention, the amidation reaction is continued to the desired degree of amidation.

As component D, preferably less than 20, especially less than 15, wt % of physically curing resins are applied.

As physically curing resins (curing binder component) (D), there can be worked in e.g. known maleate resins such as Alresat KM 313 and Alresat KM 224, colophony-modified phenolic resins such as Albertol KP 626 (Hoechst), ketone-formaldehyde resins such as Synthetic Resin SK (Hüls) or Ketone Resin N (BASF), that ensure the rapid physical drying of the coating and are worked in e.g. at temperatures of 20° to 150° C. In the aqueous form of application they produce a good storage stability and in the finished coating they provide a high gloss.

To achieve a uniform distribution of the physically curing resin of component (D) in the aqueous polydiene binder, e.g. polybutadiene binder, the resin is advantageously worked into the resin melt or the resin solution before dissolving the resin in water.

After the amidation, instead of or simultaneously with the working-in of the physically curing resin, one or several α,β-ethylenically unsaturated monomers, for example acrylic acid or methacrylic acid esterified with linear, branched or cyclic $C_1$ to $C_{12}$ monoalcohols can be added.

The monomers can be used alone or together with the curing resins. Preferably monomers in amounts of 0.1 to 10 wt %, especially 0.5 to 3 wt %, relative to the sum of components A, B, C, D and E are applied.

The adduct produced from the aforementioned starting materials is not dispersible in water. In order to make it dilutable with water, the acid groups of the adduct are at least partially neutralized. Such a neutralization should cover between 15 and 100%, preferably 20 to 80%, of the carboxyl groups. Examples of neutralizing agents are the amines and other neutralizing agents listed below.

To produce a stable emulsion the anhydride groups present are hydrolyzed with water, optionally in presence of tert, secondary or primary amines such as methylamine, ethylamine, propylamine, dimethylamine, diethylamine, dipropylamine, trimethylamine, triethylamine and triethanolamine, and the free carboxyl groups neutralized. Also suitable as basic compounds that can be used for such neutralization, apart from the amines mentioned, are ammonia and alkali metal hydroxides, oxides, carbonates or hydrogen carbonates, such as for example the corresponding lithium, sodium and potassium salts.

The pH value (20°) of the aqueous dispersion of the neutralized semi-amide is preferably in the range 6.0 to 10.0, especially 7.0 to 9.0. If the pH value is too low, phase separation can occur in the dispersion.

According to the invention, the grafting reaction of the polymerizable vinyl monomers on the polybutadiene oil, which has already been modified like a polymer, is carried out in the same way as is customary in the emulsion polymerization of polymerizable vinyl monomers, i.e. by reaction of the aforementioned neutralized product with the ethylenically unsaturated monomer (E), which is polymerizable by the radical mechanism, in presence of a radical-type polymerization initiator at 10° to 120° C. in aqueous emulsion, optionally under pressure. There can be used as polymerization initiators e.g. azo compounds, such as 2,2'-azobis(isobutyronitrile), peroxides such as tert-butyl peroxybenzoate or butylperoxy 2-ethylhexanoate or hydroperoxides.

Preferred monomers (E) are monomers having at least one ethylenic double bond polymerizable by the radical mechanism. Examples are vinyl, vinylidene, acrylic and methacrylic compounds such as styrene, α-methylstyrene, vinyltoluene, acrylate and methacrylate esters of $C_1$–$C_{12}$ alcohols, that can be linear, branched or cyclic, allyl acrylate, allyl methacrylate, methacrylic acid, acrylamide and mixtures of these monomers. Hard monomers without further functional groups, i.e. with a glass transition temperature of the homopolymers preparable from them of 25° to 200° C., are preferred. The reaction with styrene is especially preferred.

According to the invention, the chosen amount of the monomers (E) depends on the kind of monomers and the application of the final product, but is preferably 1 to 40 wt %, relative to the amount of the product to be grafted, optionally partially amidated and esteramidated, especially above 10 and below 35 wt %.

If necessary, further conventional polymerization inhibitors or polymerization regulators (molecular weight regulators) are used, such as dodecyl mercaptan, tert-dodecyl mercaptan, 2-mercaptoethanol and 3-mercaptopropionic acid etc.

For the various applications these resinous products exist as very finely dispersed aqueous dispersions with a solid resin content of 10 to 60 wt %, preferably 15 to 45 wt % The term "aqueous dispersion" used here includes two-phase, aqueous resin systems, especially those in which the aqueous phase forms the continuous phase, and also includes hydrosols and colloidal solutions. The aqueous dispersions, which visually appear clear, have discontinuously dispersed phases with an average particle diameter preferably below 500 nm.

The aqueous emulsions according to the invention are valuable binders for coatings and are mixed with usual constituents such as driers, e.g. cobalt naphthenate and manganese naphthenate, pigments, e.g. according to DIN 55944 such as titanium white, calcium carbonate and silicic acid, wetting agents, plasticizers and/or thickeners and water. They form water-dilutable lacquers with excellent drying properties, which yield films with good water resistance. Furthermore, usual additives, such as antioxidants, wetting agents, antifoaming agents, levelling agents etc., can be added.

After application of the lacquers produced from the binders according to the invention to substrates, e.g. metals, plastics surfaces or wood, efficient primer coats with good lacquer technology properties and clearly improved intercoat adhesion when recoated with finishes, are obtained. The aqueous resin can also be applied directly without further additives as a lacquer for producing transparent coatings. For producing aqueous corrosion-protected lacquers, extenders and pigments such as iron oxides, lead oxides, strontium chromate, carbon black, titanium oxide, talc or barium sulphate and mixtures of these and other conventional finely divided inorganic substances are suitable.

The pigmented binder dispersions can furthermore contain conventional dispersants or conventional surface active agents, of which the latter should be of the nonionic or anionic type or a combination of these conventional, suitable types.

Usually pigments and surface active agents, if used, are transferred together with a part of the substrate resin in a paste. Examples of other suitable conventional additives that can be added to the coating compounds are conventional driers, suitable wetting agents, suitable antifoam agents and suitable emulsifiers. It is frequently desirable to add small quantities of water-miscible organic solvents, such as e.g. dioxane and glycol ethers, to the substrate resin in order to facilitate its handling and processing.

In general it is desirable that the pigment-containing dispersions contain the pigment and the substrate resin in a ratio of not more than 1.5:1 and preferably not more than 1:1. The pigment can be milled directly into the binder according to the invention or be admixed with the aid of a conventional paste resin.

The lacquers produced from these binders are applied according to the processes usual in practice, such as spraying, dipping, pouring, rolling etc. An addition of 1 to 5 wt % of polyfunctional carbodiimides or polyisocyanates to the binder can cause an additional improvement to the drying times.

The invention is illustrated in the following examples. All data on parts and percentages relate to weight.

COMPARATIVE TEST

Maleate oil, one-third semi-amidated a. Base polymer

Into a 4-liter glass flask, provided with a nitrogen inlet tube, a stirrer and a cooler and heater, there are weighed 1707 g of a polybutadiene oil with a molecular weight (Mn) of 1500, a viscosity of ca. 800 mPa.s (20°), and having ca. 75% 1,4-cis, ca. 24% 1,4-trans and 1% vinyl double bonds, and 570 g of a polybutadiene oil with a molecular weight (Mn) of 3000, a viscosity of ca. 3000 mPa.s (20°) and having ca. 80% 1,4-cis, ca. 19% 1,4-trans and 1% vinyl double bonds, and, after adding 424 g maleic anhydride, 1.2 g phenyl-α-naphthylamine, 0.3 g acetylacetone, 0.3 g N,N'-diphenyl-p-phenylenediamine and 190 g xylene, the mixture is heated to 190° to 210° C. while passing a slow nitrogen stream and held at this temperature for 8 hours. A viscous oil is obtained, with an acid number after opening the anhydride ring with water of 150. After cooling to 100° C., 105 g diethylamine are added over 2 hours with reflux cooling and the mixture stirred at this temperature for 2 hours until an acid number of 100 is reached.

b. Vinylation

This maleated polybutadiene oil (312 g) is mixed with 4.5 g of the antiskinning agent Additol XL 297 (Hoechst) in a 4-liter glass flask provided with a nitrogen inlet tube, a stirrer and a cooler and heater and heated to 80° C. while passing a slow nitrogen stream, and 37 g triethylamine and 900 g deionized water are added while stirring. To the dispersion obtained, 160 g styrene are added in presence of 5 g 2,2'-azobis(2-methylbutane nitrile) and 0.5 g dimerized α-methylstyrene. The mixture is stirred for 6 hours under nitrogen at 90° C. A homogeneous polymer emulsion is obtained, with the following properties: pH value 8.7, solids content 31 wt %, acid number 71, viscosity 1811 mPa.s (20° C.), after drying for 1 hour at 150° C.

EXAMPLE 1

Maleate oil, one-third semi-amidated and reacted with bis(2-oxazoline)

a. Base polymer

Into a 4-liter glass flask, provided with a nitrogen inlet tube, a stirrer, a cooler and a heater, there are weighed 2280 g polybutadiene oil with a molecular weight (Mn) of 1500, a viscosity of ca. 800 mPa.s (20° C), and having ca. 75% 1,4-cis, ca. 24% 1,4-trans and 1% vinyl double bonds, and after adding 424 g maleic anhydride, 1.2 g phenyl-α-naphthylamine, 0.2 g acetylacetone, 0.2 g N,N'-diphenyl-p-phenylenediamine and 190 g xylene and while passing a slow nitrogen stream, the mixture is heated to 190° to 210° C. and held at this temperature for 8 hours. A viscous oil is obtained, with an acid number after opening the anhydride ring with water of 165. After cooling to 100° C., 18 g diethylamine are added over 2 hours with reflux cooling and the mixture stirred at this temperature. The product is subsequently cooled to 70° C., 27 g 1,4-phenylenebis(2-oxazoline) are added at this temperature, and after heating to 110° C. this temperature is maintained for 3 hours. After adding 69 g diethylamine, the mixture is stirred for a further 2 hours at 100° C., so that a resin with an acid number of ca. 95 results.

b. Vinylation

This maleated and partially semi-amidated polybutadiene oil (312 g) is charged with 4.5 g of the antiskinning agent Additol XL 297 (Hoechst) to a 4-liter glass flask provided with a nitrogen inlet tube, a stirrer, a cooler and a heater and heated to 80° C. while passing a slow nitrogen stream, and mixed with 37 g triethylamine and 900 g deionized water while stirring. To the emulsion obtained, 160 g styrene are added in presence of 5 g 2,2'-azobis(2-methylbutane nitrile) and 0.5 g dimerized α-methylstyrene. The mixture is stirred for 6 hours under nitrogen at 90° C. A homogeneous polymer emulsion is obtained, with the following properties: pH value 8.5, solids content after drying for 1 hour at 150° C. 33 wt %, acid number 70, viscosity 2100 mPa.s.

EXAMPLE 2

Maleate oil, semi-amidated and reacted with bis(2-oxazoline) and a second binder component a Base polymer In a 2-liter flat-ground reaction flask, provided with a nitrogen inlet tube, a stirrer, a cooler and a heater, 328 g semi-amidated polybutadiene maleate oil, reacted with bis(2-oxazoline) (as in Example 1), are heated with 24 g Alresat KM 224° to 130° C., and held at 130° C. until a clear, homogeneous melt is formed. The mixture is then cooled to 90° C. and 38.8 g triethylamine and 116.7 g deionized water are run in over 15 minutes. The product, stirred until homogeneous, is mixed with 831 g deionized water over 20 minutes. A very finely dispersed emulsion is obtained.

b. Vinylation

To this polybutadiene oil dispersion there is added uniformly over 4 hours with stirring a mixture of 114 g styrene, 6.9 g dimerized α-methylstyrene and 3.15 g 2,2'-azobis(2-methylbutane nitrile), and the product stirred for a further 4 hours under nitrogen at 90° C. A polymer emulsion with the following values is obtained: solids content after drying for 1 hour at 150° C. 33.8 wt %, pH value 8.7, acid number 83.8.

Production of primers

An anticorrosive primer containing zinc pigment is produced conventionally. The binder dispersion according to the examples is charged to a mixing vessel. While stirring rapidly, the pigments and additives are slowly added and stirred in. This predispersed millbase is then dispersed in a bead mill at ca. 3000 rpm and a temperature of 42° C. 24 hours after the milling, the finished lacquer is adjusted with water to a spraying viscosity, corresponding to an efflux time of 30 seconds measured in a flow-cup with 4 mm nozzle according to DIN 53 211. All lacquers were simultaneously adjusted to the pH value 9.

| Milling recipe | Example g |
|---|---|
| Binder dispersion | 330 |
| Iron oxide | 58 |
| Zinc phosphate | 58 |
| Zinc oxide | 6 |
| Lithopone | 58 |
| Microtalc | 28 |
| Foam prevention agent | 1 |
| Water | 15 |
| Mill base | 554 |

| Lacquering: | Comparative Test | Examples 1 | 2 |
|---|---|---|---|
| Viscosity corresponding to efflux time in DIN flow-cup 4 mm/20° C. (sec) | 35 | 35 | 35 |

The lacquers produced from the binder according to the invention were sprayed on to degreased autobody sheet and tested without a finish. The following results were then obtained.

TABLE 1

| Film Properties on Autobody Sheets | | | |
|---|---|---|---|
| | Comparative test | 1 | 2 |
| Dry film thickness (μm) | 30 | 30 | 30 |

TABLE 1-continued

| Film Properties on Autobody Sheets | Comparative test | 1 | 2 |
|---|---|---|---|
| Drying 20 min/80° C. Pendulum hardness DIN 53153 (sec) | 42 | 85 | 96 |
| Adhesion | 1 | 1 | 1 |
| Cupping Index DIN 53156 (mm) | 5 | 5 | 4.5 |
| Water resistance Drying 20 min/80° C. | | | |
| after 1 hour | unchanged | unchanged | unchanged |
| after 3 hours | unchanged | unchanged | unchanged |
| after 24 hours | faded blisters | unchanged | unchanged |
| Corrosion protection Salt spray test (DIN 40021) | | | |
| after 120 hours | blisters | unchanged | unchanged |
| after 240 hours | blisters | slight fading slight reversible swelling | unchanged |
| Condensed water test (DIN 50017) | | | |
| after 120 hours | blisters | unchanged | unchanged |
| after 240 hours | blisters | slight fading slight reversible swelling | unchanged |

What is claimed is:

1. A binder, neutralizable by bases, for producing siccativated aqueous coating agents, based on a polydiene resin partially crosslinked with bis(2-oxazoline) with an acid number of 50 to 100, that is obtained by a reaction conducted in the absence of water, between:
   A. 40 to 80 wt % of at least one polydiene oil with a weight-average molecular weight of 300 to 5000,
   B. 5 to 25 wt % of at least one $\alpha,\beta$-ethylenically unsaturated carboxylic acid,
   C. 1 to 10 wt % of at least one bis(2-oxazoline), and
   D. 0 to 20 wt % of at least one physically curing resin and/or ethylenically unsaturated monomer, and transferring the reaction product obtained into an aqueous medium for reaction with
   E. 1 to 40 wt % of at least one ethylenically unsaturated monomer in the presence of an oil-soluble, free-radical-forming polymerization initiator and optionally a polymerization regulator, wherein each of the above percentages by weight relates to the sum of components A, B, C, D and E.

2. A binder according to claim 1, wherein the $\alpha,\beta$-ethylenically unsaturated carboxylic acid component B is an $\alpha,\beta$-unsaturated monocarboxylic acid or a semi-amide or simi-ester of an $\alpha,\beta$-ethylenically unsaturated dicarboxylic acid.

3. A binder according to claim 2, wherein the semi-amide is obtained by reaction of the anhydride of an $\alpha,\beta$-ethylenically unsaturated dicarboxylic acid with primary or secondary monoamines.

4. A binder according to claim 1, wherein 15 to 100% of the carboxyl groups are neutralized by bases.

* * * * *